Figure 1A:
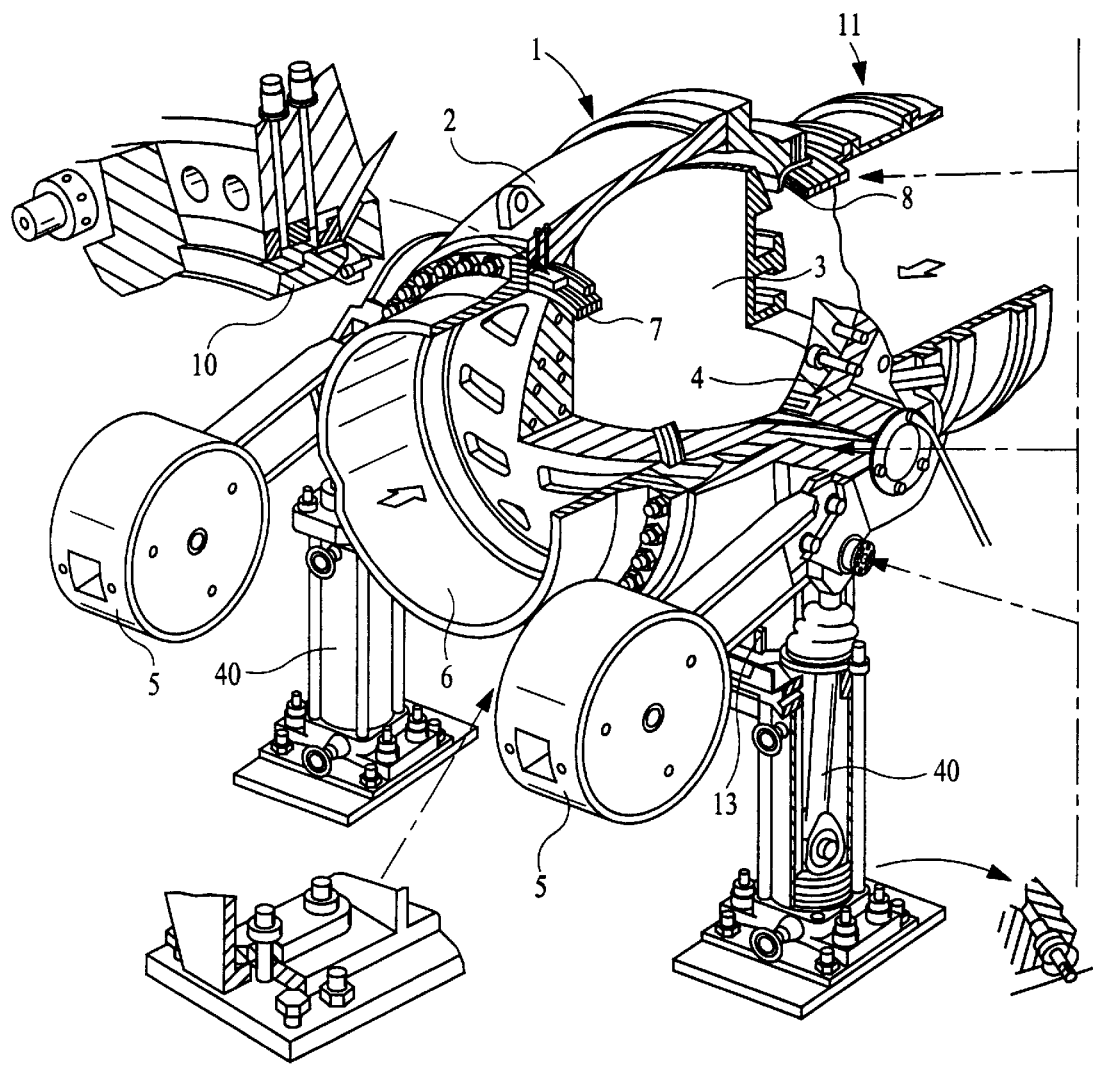

United States Patent [19]

Moss et al.

[11] Patent Number: 6,076,259
[45] Date of Patent: Jun. 20, 2000

[54] VALVE BEARING REPLACEMENT

[75] Inventors: William Owen Moss, Gwynedd; Roy Stockton, Doncaster, both of United Kingdom

[73] Assignees: Kvaerner Boving Limited; First Hydro Company, both of United Kingdom

[21] Appl. No.: 08/981,551
[22] PCT Filed: Jun. 20, 1996
[86] PCT No.: PCT/GB96/01456
§ 371 Date: Aug. 7, 1998
§ 102(e) Date: Aug. 7, 1998
[87] PCT Pub. No.: WO97/01056
PCT Pub. Date: Jan. 9, 1997

[30] Foreign Application Priority Data

Jun. 20, 1995 [GB] United Kingdom .................... 9512518

[51] Int. Cl.[7] ................................................... B23P 15/00
[52] U.S. Cl. ..................................... 29/898.01; 29/898.08
[58] Field of Search ............................. 29/889.1, 898.01, 29/898.08, 402.08, 402.03

[56] References Cited

U.S. PATENT DOCUMENTS 3,134,336  5/1964  Huffman et al. .
4,262,691  4/1981  Kacal .
5,295,300  3/1994  Garrick, Jr. .......................... 29/898.01

FOREIGN PATENT DOCUMENTS 0 303 453    2/1989   European Pat. Off. .
1101495     10/1955   France .
2 027 911   11/1971   Germany .
U 90 13 157 10/1990   Germany .

*Primary Examiner*—Irene Cuda
*Attorney, Agent, or Firm*—Fish & Richardson P.C.

[57] ABSTRACT

A method of removing or replacing a trunnion bearing of a rotary valve having a downstream side with a downstream connection and having an upstream side with an upstream connection to a high pressure penstock, the rotary valve including a valve rotor inside a valve body, the valve rotor having a trunnion within a trunnion bearing. The method includes the steps of closing the valve; separating the valve from its downstream connection; offering up a support tool to the valve body to support the valve rotor on its downstream side; connecting a pressure-retaining closure tool to the valve body on the downstream side of the valve body and in so doing forming a space between the closure tool and the support tool; pressurizing the space between the support tool and the pressure-retaining closure tool to balance a load due to a pressure at the upstream side acting on the valve rotor; adjusting the position of the support tool in order to support the valve rotor against the upstream load and to bring the rotor and its trunnion in a location enabling its bearing to be removed; securing the valve rotor in its bearing removal location by a mechanical locking structure; reducing the pressure in the space between the support tool and the pressure-retaining closure tool; and removing the trunnion bearing.

8 Claims, 7 Drawing Sheets

VALVE BEARING REPLACEMENT

This invention relates to a method for the replacement of valve bearings, and more particularly to the replacement of a trunnion bearing on a rotary valve.

In a typical modern Francis turbine-type hydroelectric power station, each of the turbines can be provided with a rotary main inlet valve (MIV) which isolates the turbine from the high pressure penstock during normal operation and for maintenance purposes. Normally the MIV operates in a balanced condition, that is to say, at zero flow. The MIV is closed whenever its associated turbine is either shutdown or is spinning in air. The MIV is similar to a conventional ball valve except that there is a clearance between the moving rotor and the valve body. This clearance is closed at each end by steel rings which slide axially in the body under hydraulic control.

The ring at the downstream end is called the service seal and operates automatically as part of the normal operating sequence of the turbine. The ring at the upstream end is called the maintenance seal and usually remains open, only being closed for isolation purposes. Each MIV is rigidly connected to an associated upper high pressure penstock on the upstream side. On the downstream side, the MIV is connected to the turbine via a dismantling joint. The dismantling joint acts as a sliding coupling to absorb axial movement of the MIV during operation and, when removed, gives access to the service seal assembly and turbine casing, and also permits removal of the valve body end cover.

the normal procedure for replacement of the MIV trunnion bearing necessitates the de-watering of the reservoir and the penstocks. This usually requires a complete station shutdown with a considerable loss of generating income and the additional risk of possible local damage to the high pressure concrete lined penstock when the internal pressure is removed.

In modern power stations, particularly those housing pump-turbines, the number of cycles of load experienced by the trunnion bearings of the MIVs far exceeds that of the trunnion bearings of the MIVs far exceeds that of older conventional power plants. This has greatly increased the need to avoid a complete station shutdown in order to replace the trunnion bearings.

Hitherto, however, there has been available no method of replacing the trunnion bearings of an MIV whilst retaining the pressure in the high pressure penstock, because, when the balancing pressure on the downstream side of the valve is removed, the load on the trunnion exerted by the pressure of water in the high pressure penstock makes it impossible to remove the trunnion bearings. Typically the load on the closed valve rotor can be up to 3,500 tonnes and, in order to remove the trunnion bearing, it may be necessary to support and hold the valve rotor to a positional tolerance of plus or minus 0.1 mm to enable the trunnion to be centralised in its diametral bearing clearance.

According to the present invention, there is provided a method for removal or replacement of a rotary valve trunnion bearing which comprises transferring the load from the trunnion bearings to an axially adjustable support means controlled by a pressurisable closure means and retained by a mechanical locking means.

According to one aspect of the invention there is provided a method of removing or replacing a trunnion bearing of a rotary valve connected to a high pressure penstock which comprises:

(i) closing the valve;
 (ii) separating the valve from its downstream connection;
 (iii) offering up a support means to the valve body to support the valve rotor on its downstream side;
 (iv) connecting a pressure-retaining closure means to the valve body on the downstream side of the support means;
 (v) pressurising the space between the support means and the pressure-retaining closure means to balance the load due to the pressure at the upstream side acting on the valve rotor;
 (vi) adjusting the position of the support means in order to support the valve rotor against the upstream load and to bring the rotor and its trunnions in a location enabling its bearing to be removed;
 (vii) securing the valve rotor in its bearing removal location by mechanical locking means;
 (viii) reducing the pressure in the space between the support means and the pressure-retaining closure means;
 (ix) optionally, repeating steps (v), (vi), (vii) and (viii) until the trunnion is substantially centrally positioned in its bearing; and
 (x) removing or replacing the trunnion bearing as required.

Preferably the support means comprises a support ring, which is preferably adapted to move axially, for example, in response to hydraulic pressure between the support ring and the pressure-retaining closure means. The mechanical locking means can comprise, for example, peripherally arranged pre-tensioned studs which are preferably provided with shims whereby the support means can be axially retained in a desired position.

The pressure-retaining closure means preferably comprises a domed cover which can be connected to the valve body, for example, by the aforementioned peripheral series of studs. Hydraulic pressure can be introduced to the domed cover by pumping, and monitored using a suitable pressure gauge.

Preferably the space between the support means and the pressure-retaining closure means is hydraulically pressurised such that the support means together with the rotor is moved axially, against the high pressure load, until the rotor trunnion moves fully upstream in its bearing gap. This movement is usually of the order of 1 mm or less.

Figure 1B:
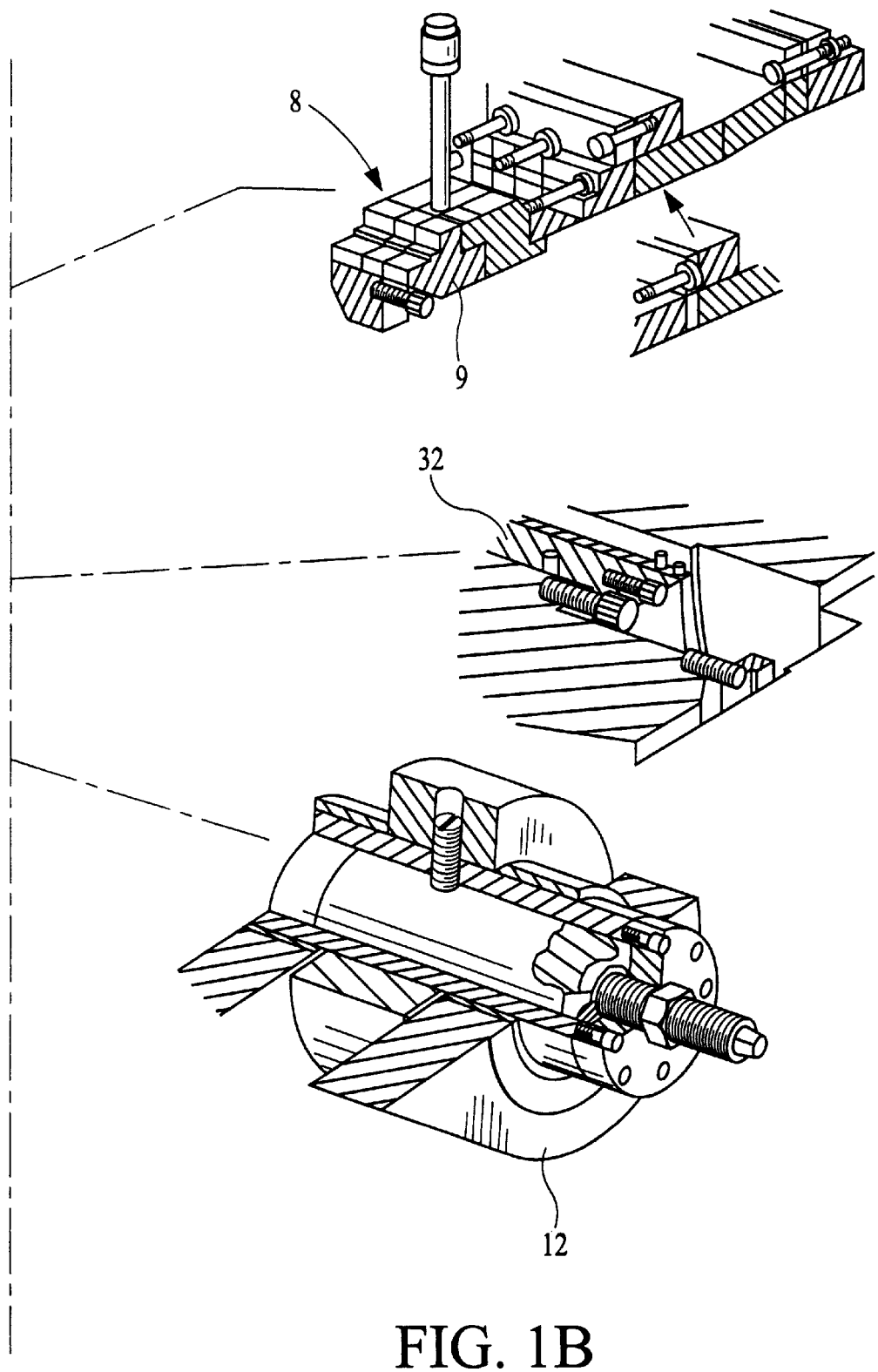
Figure 2:
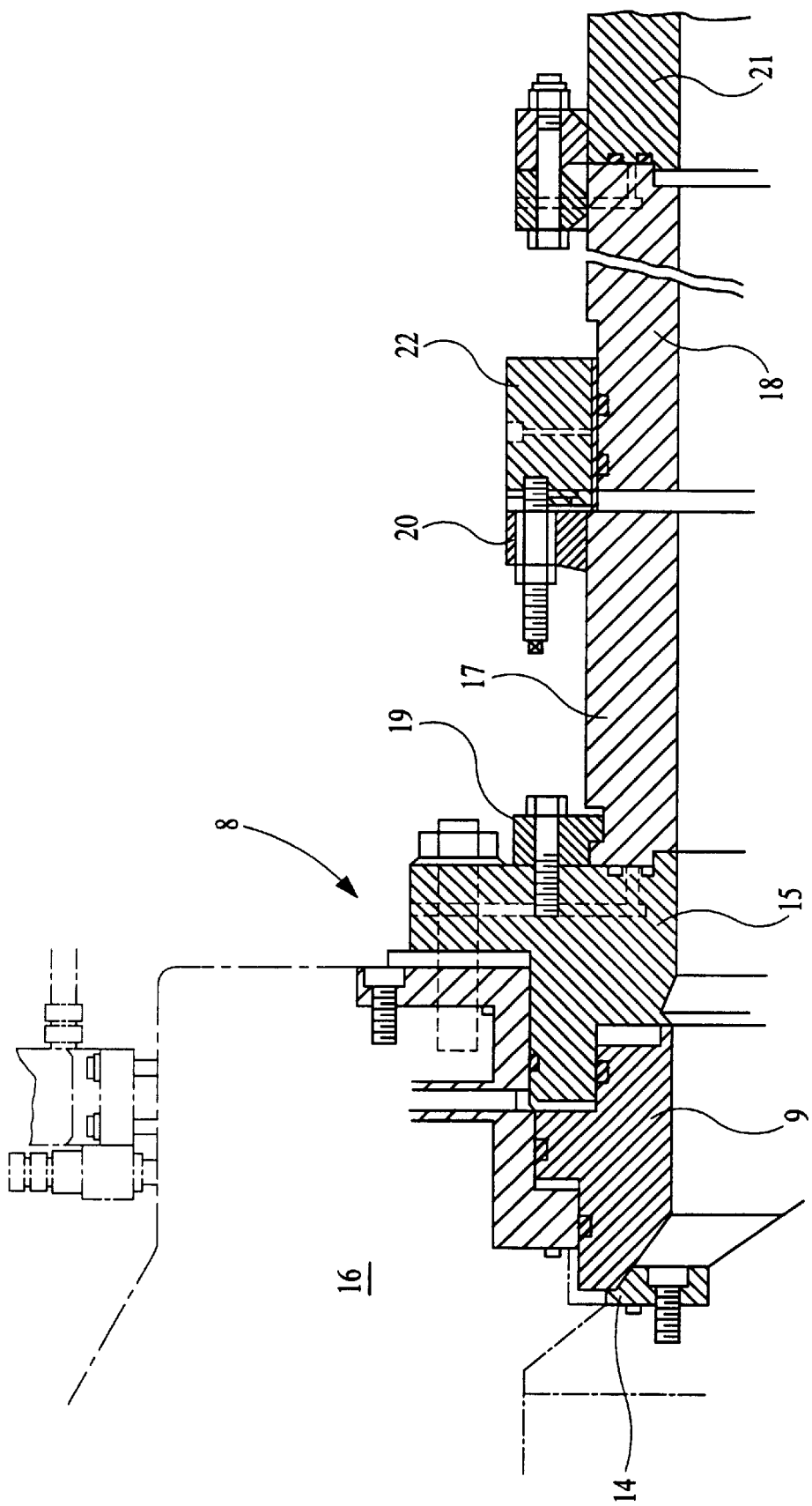
Figure 3:
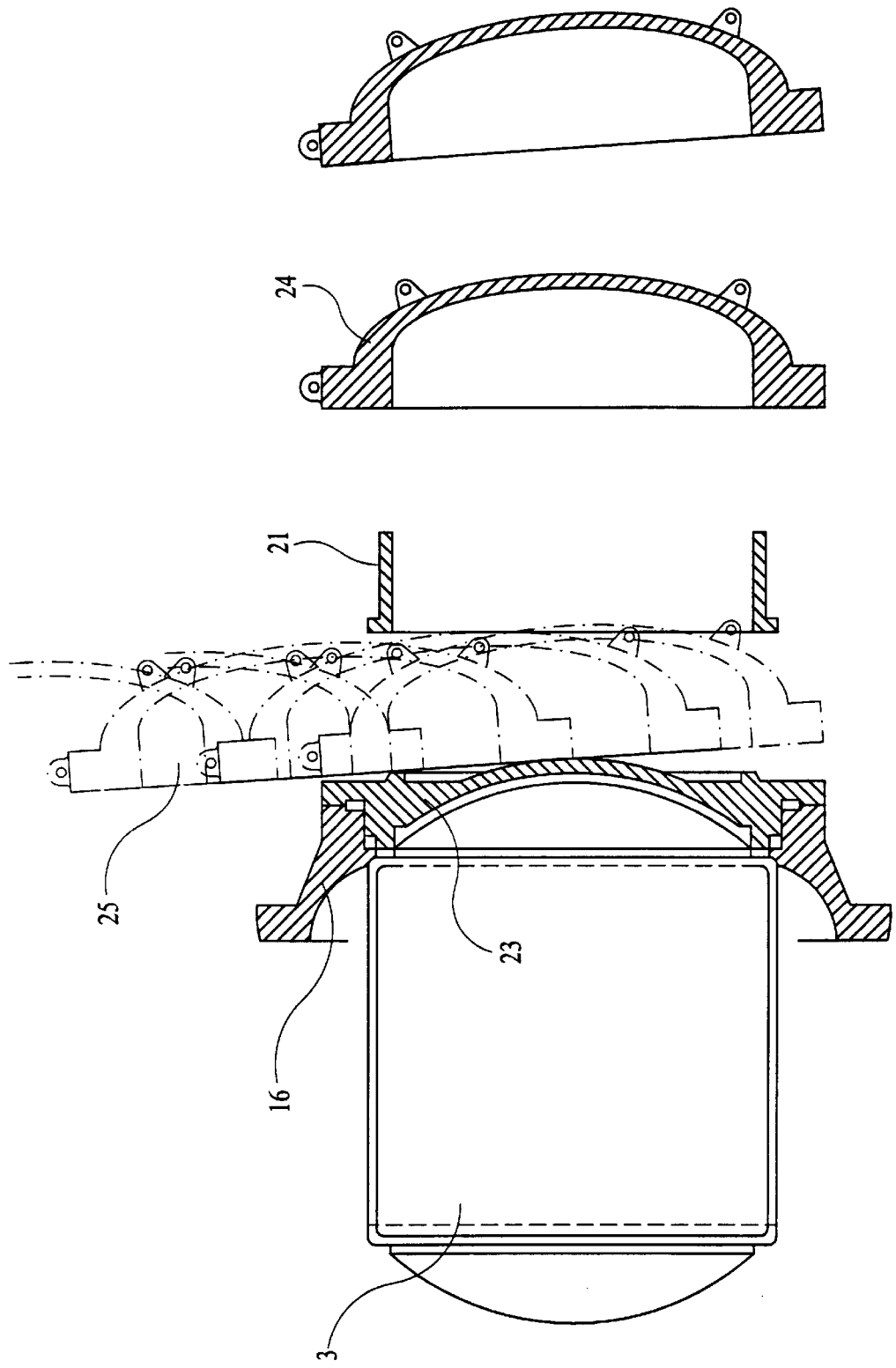
Figure 4:
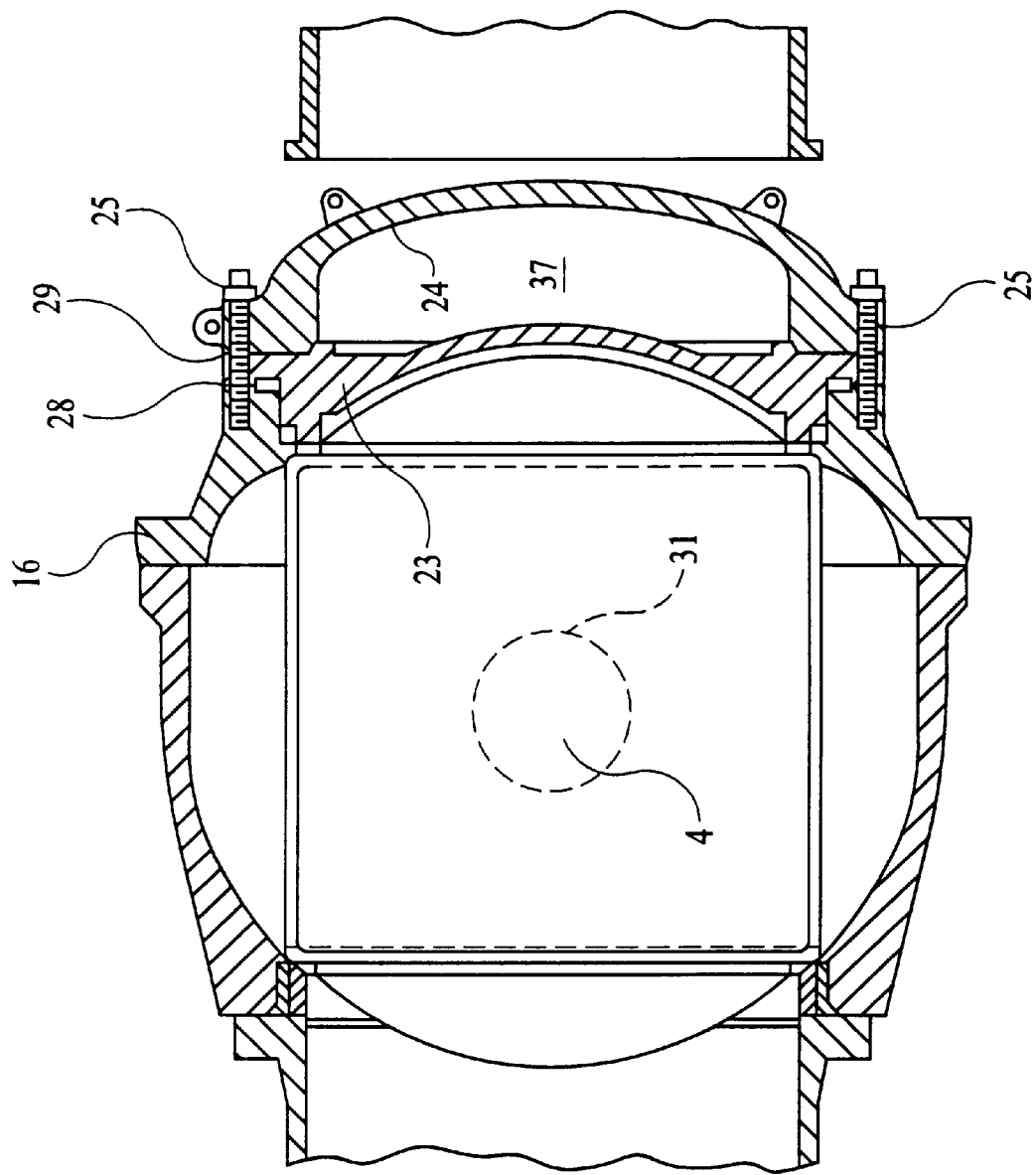
Figure 5:
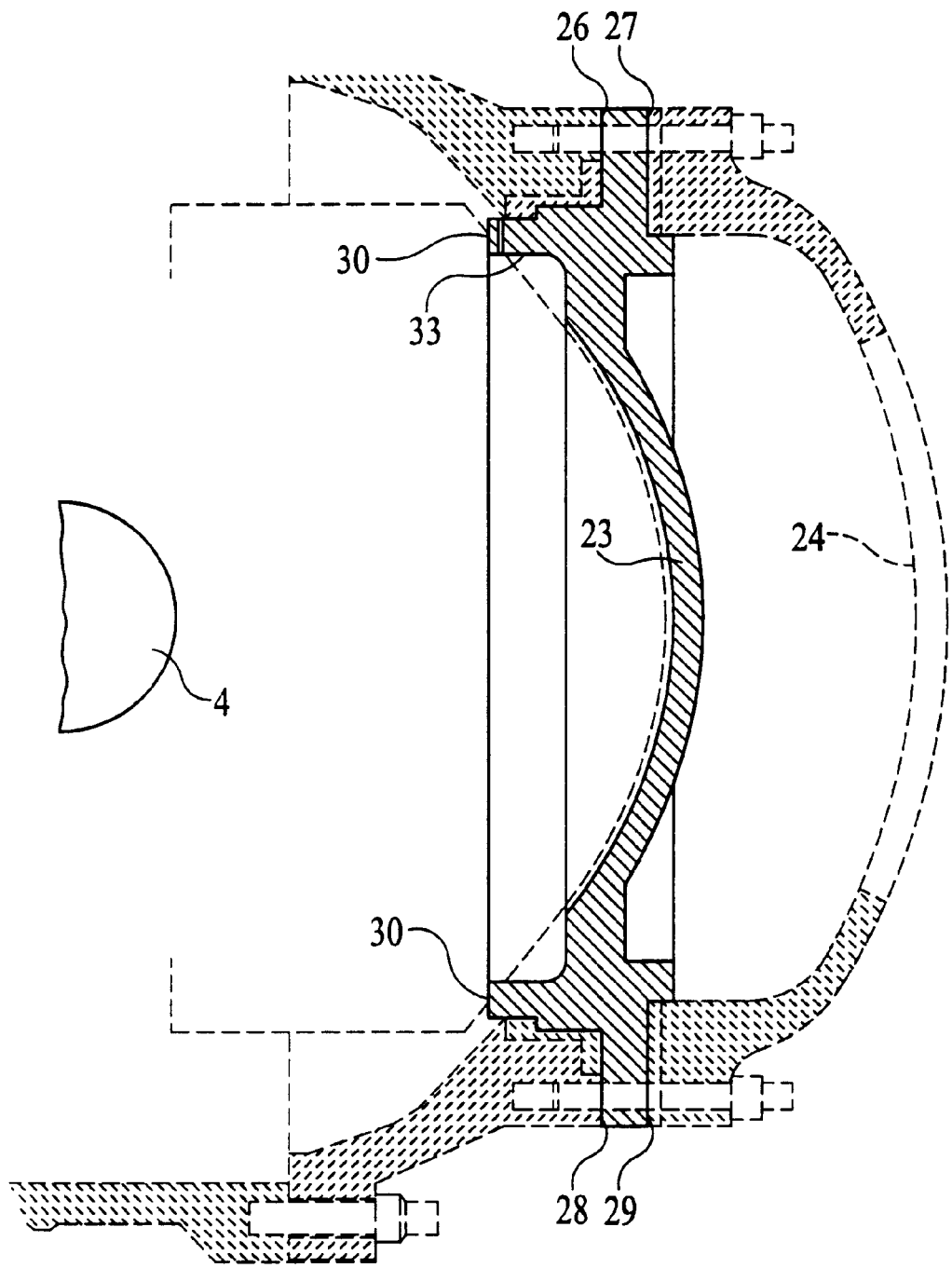
Figure 6:
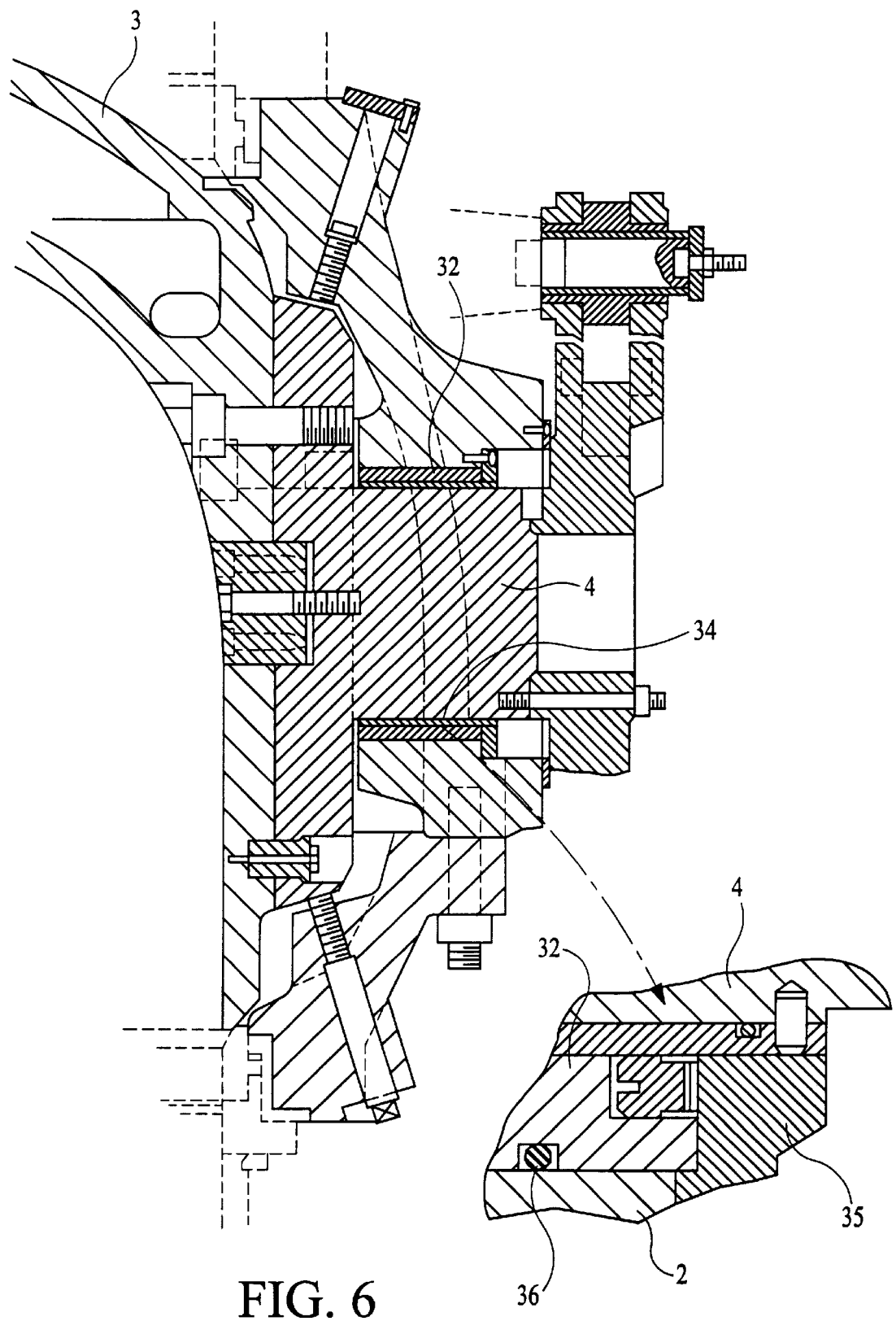

The invention will now be more fully described, by way of example, only, with reference to the accompanying Drawings in which:

FIG. 1 shows an exploded view, partly in section, of a typical main inlet valve;
 FIG. 2 shows a sectional side elevation of the service seal and dismantling joint assembly of the valve of FIG. 1;
 FIG. 3 shows diagrammatically the positioning of the domed cover between the valve and the downstream penstock;
 FIG. 4 shows a sectional side elevational view of the valve with the domed cover installed;
 FIG. 5 shows a more detailed sectional side elevation of the installed domed cover and support ring assembly; and
 FIG. 6 shows a sectional plan view of the trunnion assembly of the valve of FIG. 1.

Referring first to FIG. 1, the rotary main inlet valve illustrated generally at 1 has a body 2 and a rotor 3 mounted on trunnions 4 (only one trunnion is shown). The valve is opened by twin oil pressure operated servo motors 40 and closed by weights 5, with the servo motors acting as dashpots. The upstream end 6 of the valve body is connected to the high pressure penstock. The clearance between the valve rotor 3 and the body 2 is closed at each end by ring assemblies 7, 8 comprising seals which slide axially in the body 2 under hydraulic control. The downstream ring assembly 8 comprises a service seal 9 and operates automatically as part of the normal operating sequence of the turbine. The upstream ring assembly 7 comprises a maintenance seal 10 and usually remains open, only being closed for isolation purposes.

On the downstream side the valve is connected to an intermediate penstock via a dismantling joint assembly illustrated generally at 11. The dismantling joint assembly acts as a sliding coupling to absorb axial movement of the valve during operation and, when removed, gives access to the service seal assembly.

The valve rotor can be locked in position by means of a locking pin assembly 12.

The service seal is operated by means of a hydraulic service seal operating assembly 13.

The service seal and dismantling joint assembly is shown in more detail in FIG. 2. The assembly 8 comprises the service seal 9, bounded on one side by a rotor seating ring 14 and on the other side by a moveable flange 15, which is connected to the body end cover 16. The dismantling joint upstream flanged pipe 17 is positioned between the moveable flange 15 and the downstream flanged pipe 18, and is retained in place by ring 19. The flanged pipe 18 is connected to the intermediate penstock 21. The two halves of the dismantling joint are closed by a sealing ring 22 which is retained by the flange 20.

In carrying out the method of the invention, the service seal 9, moveable flange 15, the dismantling joint pipes 17, 18 and sealing ring 22 are removed, and replaced by support ring 23, as shown in FIG. 3. The gap between the intermediate penstock 21 and the support ring 23 is just large enough to accommodate a domed cover 24 which can be lowered between them, using a crane or a hoist, at a slight angle to the vertical, as illustrated by the motion lines 25 in FIG. 3.

The valve with the domed cover installed is illustrated in FIGS. 4 and 5. The support ring 23 and domed cover 24 are secured to the body-end cover 16 by a series of M90 studs 25, forty eight in number. The support ring 23 bears upon the valve rotor 3 at the interface 30 and can be moved axially by hydraulic pressure in the domed cover in order to increase or decrease the downstream gap 31 between the trunnion 4 and the trunnion bearing 32 (see FIGS. 1 and 6). One or more shims 26, 27 can be inserted respectively in gaps 28, 29 to retain the support ring 23 and valve rotor 3 in the correct axial position.

The trunnion assembly is illustrated in more detail in FIG. 6. The trunnion 4 comprises a replaceable liner 34 which is interposed between the trunnion and the trunnion bearing 32. A seal 35 seals the gap between the liner 34 and the bearing 32. The gap between the bearing 32 and the valve body 2 is, in turn, sealed by an O-ring 36.

In a preferred method according to the invention, the valve 1 is first closed, and the upstream maintenance seal 7 and the rotor lock 12 are applied. The valve body 2 and the intermediate penstock are then drained and a check is made that the axes of the rotor 3 are square with the penstock axis. The maintenance seal is checked for any leakage.

Next the service seal and dismantling joint assembly 8, comprising the service seal 9, the moveable flange 15, the loose flange 17, and the flange pipe 18, is removed and the support ring 23, domed cover 24 and M90 studs 25 are installed. The domed cover 24 is lowered between the support ring 23 and the downstream intermediate penstock stud pipe 21 at a slight angle to the vertical, as illustrated in FIG. 3.

The servo motors 4 and closing weights 5, with associated levers, are then removed.

At this stage, appropriate machinery can be installed for measuring the wear in the trunnion liner 34 and machining the trunnion if necessary.

In order to centre the trunnion 4 in its bearing, hydraulic pressure is applied to the interior 37 of the domed cover 24, between the domed cover and the support ring 23, until the pressure from the high pressure penstock and the pressure in the valve body 2 and domed cover 24 are balanced. The maintenance seal is then opened and the valve rotor positioned squarely with the penstock axis.

In the next step the maintenance seal 7 is re-applied, and the valve body 2 and domed cover 24 depressurised.

The pressure in the domed cover 24 is then re-applied, and increased, whilst monitoring carefully the gaps 28, 29 and bearing gap 31. The pressure is increased until the rotor trunnion 4 moves fully upstream in its bearing gap. Shims are then applied to the gaps 28, 29, and the M90 studs 25 are pre-tensioned.

The pressure in the domed cover 24 is then reduced once more, whilst monitoring the bearing clearance gap 31. If the trunnion 4 is not centrally positioned in the bearing 32 when the pressure in the domed cover 24 is removed, the pressurising and de-pressurising steps are repeated, with appropriate adjustment to the shims 26, 27 and the pre-tensioning of the M90 studs 25, until the trunnion is centrally positioned when the pressure is removed.

At this point a strongback can be fitted to one of the valve trunnions and the bearing of the opposite trunnion can be removed, since it is now free of the trunnion load. Removal of the trunnion bearing permits inspection of the trunnion liner and allows appropriate remedial work to be carried out as required. When remedial work is complete, the process can be repeated on the other trunnion and the various parts replaced or restored in the reverse order.

As described above, the method of the invention can permit a main inlet valve trunnion bearing to be removed or replaced without the necessity to de-water the reservoir of a power station and whilst the load from the high pressure penstock is maintained.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). This invention extends to any novel one, or any novel combination, of the features disclosed in this specification (including any accompanying claims, abstract and drawings), or to any novel one, or any novel combination, of the steps of any method or process so disclosed.

What is claimed is:

1. A method of removing or replacing a trunnion bearing of a rotary valve having a downstream side with a downstream connection and having an upstream side with an upstream connection to a high pressure penstock, the rotary valve comprising a valve rotor inside a valve body, the valve rotor having a trunnion within a trunnion bearing, said method comprising:

(i) closing the valve;
   (ii) separating the valve from its downstream connection;
   (iii) offering up a support tool to the valve body to support the valve rotor on its downstream side;

(iv) connecting a pressure-retaining closure tool to the valve body on the downstream side of the valve body and in so doing forming a space between the closure tool and the support tool;

(v) pressurizing the space between the support tool and the pressure-retaining closure tool to balance a load due to a pressure at the upstream side acting on the valve rotor;

(vi) adjusting the position of the support tool in order to support the valve rotor against the upstream load and to bring the rotor and its trunnion in a location enabling its bearing to be removed;

(vii) securing the valve rotor in its bearing removal location by a mechanical locking structure;

(viii) reducing the pressure in the space between the support tool and the pressure-retaining closure tool;

(x) removing the trunnion bearing.

2. A method according to claim 1, further comprising using as at least part of the support tool a support ring which is adapted to move axially in response to hydraulic pressure between the support ring and the pressure-retaining closure tool.

3. A method according to claim 1, further comprising using for at least part of the mechanical locking structure pre-tensioned studs peripherally arranged with respect to the support tool and the pressure-retaining closure tool.

4. A method according to claim 3, further comprising providing the studs with shims so that the position of the support tool can be axially retained.

5. A method according to claim 1, further comprising using a domed cover for at least part of the pressure-retaining closure tool.

6. A method according to claim 1, wherein the trunnion resides within a bearing gap and the step of pressurizing the space between the support tool and the pressure-retaining closure tool comprises hydraulically pressurizing the space such that the support tool together with the rotor is moved axially, against the high pressure load, until the rotor trunnion moves fully upstream in its bearing gap.

7. A method according to claim 1 further comprising repeating steps (v), (vi), (vii) and (viii) until the trunnion is substantially centrally positioned in its bearing.

8. A method according to claim 1 further comprising replacing the removed trunnion bearing with another trunnion bearing.

* * * * *